US006710271B2

(12) United States Patent
Spedale et al.

(10) Patent No.: US 6,710,271 B2
(45) Date of Patent: Mar. 23, 2004

(54) CENTRIFUGAL OPERATED SWITCH

(75) Inventors: Joseph J. Spedale, Chicago, IL (US); Ghaffar Kazkaz, Rolling Meadows, IL (US); Frank Villari, Oak Park, IL (US); Tao-Ming Wang, Long Grove, IL (US); Daniel J. Danek, Berwyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/273,745

(22) Filed: Oct. 18, 2002

(65) Prior Publication Data

US 2003/0094361 A1 May 22, 2003

Related U.S. Application Data

(60) Provisional application No. 60/340,049, filed on Oct. 19, 2001.

(51) Int. Cl.[7] ........................ H01H 35/10; H02K 11/00

(52) U.S. Cl. .................................. 200/80 R; 310/68 E

(58) Field of Search ........................... 200/80 R, 80 A, 200/80 B; 310/68 A, 68 E

(56) References Cited

U.S. PATENT DOCUMENTS

| | | | | |
|---|---|---|---|---|
| 3,609,421 A | | 9/1971 | Hilderbrandt | 310/68 |
| 3,731,471 A | | 5/1973 | Bening | 56/10.5 |
| 3,733,794 A | | 5/1973 | Allen | 56/10.5 |
| 3,950,626 A | | 4/1976 | Greenhut | 200/80 R |
| 4,208,559 A | | 6/1980 | Gray | 200/329 |
| 4,262,225 A | | 4/1981 | Hildebrandt et al. | 310/68 E |
| 4,289,988 A | | 9/1981 | Schaefer | 310/68 E |
| 4,296,366 A | * | 10/1981 | Hildebrandt et al. | 200/80 R X |
| 4,336,472 A | | 6/1982 | Czech | 310/68 E |
| 4,484,114 A | | 11/1984 | Ebbs | 318/138 |
| 4,488,363 A | | 12/1984 | Jackson et al. | 34/55 |
| 4,598,185 A | | 7/1986 | Moore | 200/80 R |
| 4,894,496 A | * | 1/1990 | Palumbo | 200/80 R |
| 5,602,436 A | | 2/1997 | Sherman et al. | 310/68 E |
| 5,814,966 A | | 9/1998 | Williamson et al. | 318/798 |
| 6,037,692 A | | 3/2000 | Miekka et al. | 310/198 |
| 6,201,325 B1 | | 3/2001 | Logsdon et al. | 310/68 E |
| 6,246,135 B1 | | 6/2001 | Chang | 310/68 E |

* cited by examiner

*Primary Examiner*—J. R. Scott
(74) *Attorney, Agent, or Firm*—Mark W. Croll; Paul F. Donovan

(57) ABSTRACT

A centrifugal operated switch particularly suitable for operating a circuit for starter windings of a motor. A spindle is connected to and rotated by the motor shaft. Swing arms connected to the spindle move upwardly and outwardly in response to rotational speed of the spindle. A plunger is movable in the spindle, and moves together with movement of the swing arms. The plunger is operationally connected to a contactor having one end electrically connected to a first terminal, and a second end alternatively connected to and disconnected from a second terminal. Movement of the plunger causes movement of the contactor.

24 Claims, 2 Drawing Sheets

CENTRIFUGAL OPERATED SWITCH

CROSS-REFERENCE TO RELATED APPLICATAION

This application claims benefit to U.S. provisional application Ser. No. 60/340,049, filed on Oct. 19, 2001.

FIELD OF THE INVENTION

The present invention relates to electrical switches, and more particularly, to switches operated by centrifugal forces imparted through the rotation thereof.

BACKGROUND OF THE INVENTION

It is known to provide electric motors with starter windings in addition to the normal run windings. The starter windings, as the name implies, are used upon startup of the motor to achieve higher levels of starting torque. As the motor reaches operating speeds, the circuit to the starter windings is interrupted. Various switching devices are known for interrupting the starter winding circuits.

Devices can be attached to the motor shaft or rotor, and include components moved by centrifugal force when the motor achieves a desired operating speed. Movement of the components by centrifugal force is used to operate circuit control switches. Such centrifugal switches can have wide application and use, including the control of starter winding circuitry.

In some centrifugal switches, metallic contact slip rings and brushes run in substantially continuous contact during motor operation, which can result in excessive wear to the parts. Magnetically attracted contacts also have been used, to keep the circuit closed. As the motor achieves the desired operating speed, centrifugal forces are used to overcome the magnetic attraction and open the starter winding circuit. Accumulation of dirt and grime on the magnetic contacts adversely affects this type of switch by affecting the strength of the attractive force. Other centrifugal switches are complex in construction, with several linkages and mechanism. Complex switches can be expensive to manufacture, and can be prone to failures.

The target speed of rotation at which the starter windings are deactivated can vary significantly from one motor to another. It is desirable to have a more or less standardized basic structure for a centrifugal operated switch, which can be customized for specific uses. Many structures known heretofore for centrifugal switches are customized to specific motor applications and target speeds, requiring substantial redesign for use on another motor and for another target speed. This requires manufacturers to stock completely different switches for the different uses to which the switches will be put.

The present invention is directed to overcoming one or more of the problems set forth above.

SUMMARY OF THE INVENTION

The present invention provides a centrifugal operated switch mechanism that is reliable and customizable for specific applications.

In one aspect thereof, the present invention provides a centrifugal switch with a first electrical terminal, a second electrical terminal, and an electrical contactor for establishing an electric circuit connection between the terminals. The contactor has an end movable relative to one of the terminals. A spindle is mounted for rotation. A plunger engages the contactor, and at least one swing arm is rotated by the spindle and pivotally mounted for movement by centrifugal force. The swing arm is connected to the plunger for movement thereof upon movement of the swing arm.

In another aspect thereof, the invention provides a centrifugally operated switch, with a housing; a spindle vertically mounted in the housing for rotation and having an upper end in the housing; and a plunger at the upper end of the spindle. The plunger is configured for vertical movement in the housing. Opposed swing arms are connected to the spindle for rotation by the spindle. The swing arms each are connected about a substantially horizontal pivot and have a lever below the pivot. The lever has a distal end engaging the plunger for pushing downwardly on the plunger as a rotational speed of the spindle increases. An electrically conductive contactor extends between first and second terminals, the contactor being connected to the plunger and having an end movable relative to one of the terminals upon vertical movement of the plunger.

In yet another aspect thereof, the present invention provides a method for operating a centrifugal switch, having steps of providing a housing with electrical terminals therein, a movable contactor between the terminals, a spring engaged with the contactor under tension, a spindle mounted for rotation in the housing and a plunger disposed between the spindle and the contactor; providing swing arms rotated by the spindle and responsive to changes in centrifugal force to cause movement of the plunger; moving the plunger by changing centrifugal force on the swing arms; deflecting a portion of the spring to urge the contactor into engagement with one of the terminals; and removing deflection of the spring to urge the contactor away from the one of the terminals.

In still another aspect thereof, the invention provides a centrifugally operated switch with a housing and a spindle vertically mounted in the housing for rotation. A plunger at an upper end of the spindle is configured for vertical movement in the housing. A first spring biases the plunger upwardly. Opposed swing arms are connected to the spindle, for rotation by the spindle. The swing arms are each connected about a substantially horizontal pivot and have a lever below the pivot. The levers have distal ends engaging the plunger for pushing downwardly on the plunger as a rotational speed of the spindle increases. First and second spaced electrical terminals are provided in the housing, with an electrically conductive contactor having a first end engaged with the first terminal and a second end movable between contacting and non-contacting position with the second terminal. A second spring is disposed under tension between the first terminal and the contactor. The second spring is adapted and arranged to urge the second end of the contactor away from the second terminal in a non-deflected position of the second spring, and to urge the second end of the contactor into engagement with the second terminal in a deflected position of the second spring. A coupling engages a portion of the second spring and the plunger, to transfer movement of the plunger to cause deflection of the second spring.

An advantage of the present invention is providing a centrifugal switch useful for switching the starter windings of a motor, and which can be adjusted or modified easily and quickly for use at different target speeds for switch activation, thereby reducing the number of parts required for motor manufacturers to stock.

Other features and advantages of the invention will become apparent to those skilled in the art upon review of the following detailed description, claims and drawings in which like numerals are used to designate like features.

Figure 1:
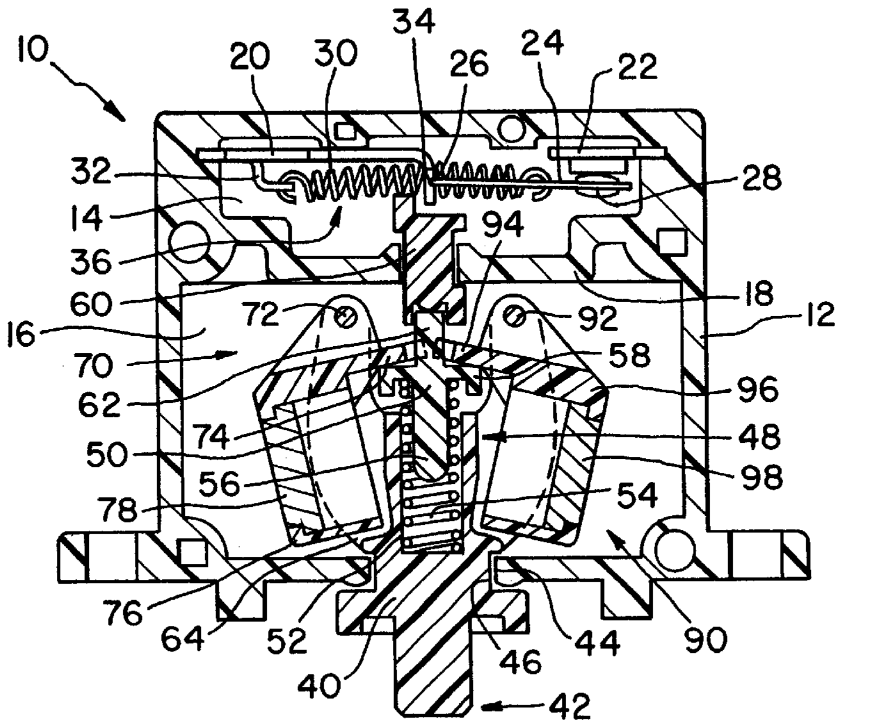
FIG. 1 is a cross-sectional view of a centrifugal operated switch mechanism in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENTS

Referring now more specifically to the drawings, and to FIG. 1 in particular, numeral 10 designates a centrifugal operated switch mechanism in accordance with the present invention. Switch mechanism 10 is particularly suitable for controlling the operation of a start winding circuit (not shown) in an electric motor (not shown).

Switch mechanism 10 includes a housing 12, which may be of plastic or the like. Housing 12 essentially defines a substantially closed electric components chamber 14, and a substantially closed mechanical components chamber 16. Chambers 14 and 16 are separated by an internal wall 18, and need not be completely sealed one from the other.

Figure 2:
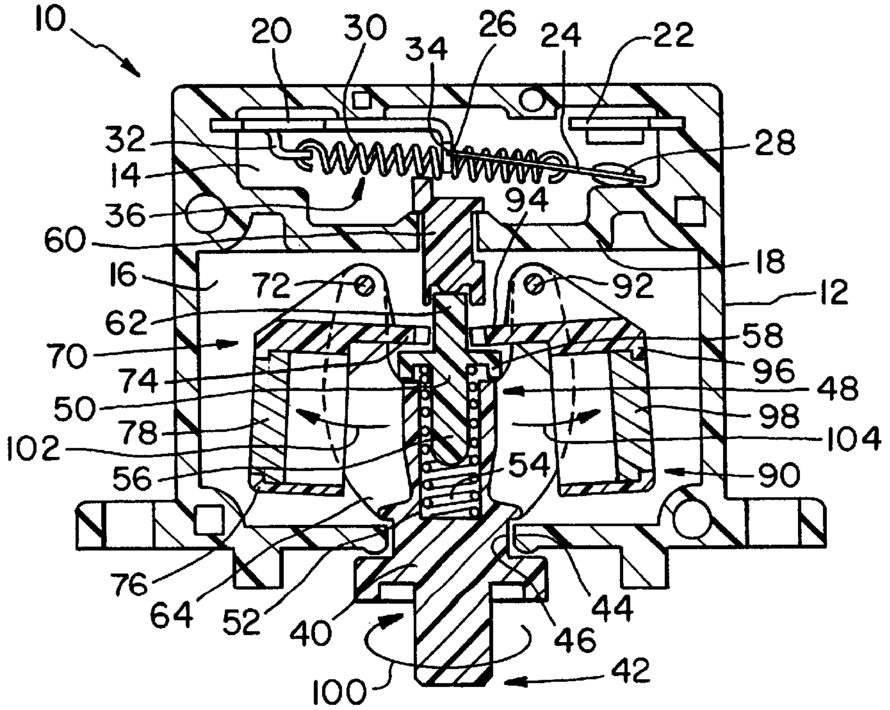
FIG. 2 is a cross-sectional view similar to that shown in FIG. 1, but illustrating the switch mechanism in another state of operation.

Within electrical components chamber 14 are a first electric terminal 20 and a second electric terminal 22, which, in known fashion are electrically connected to a start winding circuit (not shown) in a motor (not shown). An electrically conductive, movable contactor 24 is positioned between terminals 20 and 22, to selectively complete or interrupt an electric circuit path between terminals 20 and 22. In this regard, contactor 24 has a first end 26 in continuous electrical connection to first terminal 20, and a free second end 28 that can be moved into and out of electrical connection to second terminal 22. A spring 30 is connected to contactor 24 and to a bracket 32 extending downwardly from first terminal 20. To enable the desired movement of contactor 24, first end 26 thereof is lodged in a notch 34 formed in first terminal 20, and spring 30 is under tension between bracket 32 and contactor 24. When a central portion 36 of spring 30 is deflected upwardly, as shown in FIG. 1, free second end 28 of contactor 24 is urged upwardly into electrical contact with second terminal 22. When spring 30 is in a non-deflected state, as shown in FIG. 2, free second end 28 of contactor 24 is biased away from second terminal 22.

A spindle 40 is rotatably disposed in housing 12, and includes an outer end 42 which extends through an opening 44 defined by housing 12. Outer end 42 is connected to a shaft (not shown) of the motor (not shown) such that spindle 40 is rotated as the motor shaft is rotated. A bearing, low friction bushing or low friction surface 46 is provided on spindle 40, in opening 44, to facilitate long term rotation of spindle 40 in opening 44. Housing 12 can be constructed as two or more components, with opening 44 defined by two or more of such components, so that, during assembly, surface 46 can be captured in opening 44.

An inner end 48 of spindle 40 is disposed in mechanical components chamber 16, and is adapted for engagement with a plunger 50. Inner end 48 defines a cavity 52 at the end thereof. A spring 54 is disposed in cavity 52.

Plunger 50 has a reduced end 56 adapted to be received in cavity 52, and plunger 50 is biased outwardly of cavity 52 by spring 54. Alternatively, although not shown, the plunger 50 can be configured to include a cavity to surround the spring 54. Other configurations are suitable in accordance with the principles of the present invention. Plunger 50 can move upwardly and downwardly in housing 12, with reduced end 56 moving essentially axially in cavity 52. The inward movement of plunger 50 is restricted by a collar 58 that is larger than the diameter of cavity 52.

A coupling 60 mechanically links an end 62 of plunger 50 with central portion 36 of spring 30, such that axial movement of plunger 50 is transmitted through coupling 60 to spring 30. In an uppermost position of plunger 50, biased thereto by spring 54, central portion 36 of spring 30 is deflected upwardly, and contactor 26 is urged upwardly such that free second end 28 thereof is in electrical contact with second terminal 22.

Spindle 40 further includes a yoke 64 and opposed swing arms 70 and 90. Swing arm 70 is connected to yoke 64 via a horizontal pivotal axis 72 such that swing arm 70 can swing upwardly and downwardly in chamber 16 about axis 72.

Inward of, and below axis 72, a lever 74 extends inwardly toward plunger 50. Lever 74 extends above and engages collar 58. Depending downwardly from lever 74, a holder 76 extends outwardly beyond axis 72, and is adapted to receive and retain one or more weight blocks 78. Holder 76 receives and holds weight blocks 78 of different physical weight. Swing arm 70 is arranged such that upward movement of holder 76 is accompanied with downward movement of lever 74.

Swing arm 90 is connected to yoke 64 via a horizontal pivotal axis 92 such that swing arm 90 can swing upwardly and downwardly in chamber 16 about axis 92.

Inward of, and below axis 92, a lever 94 extends inwardly toward plunger 50. Lever 94 extends above and engages collar 58. Depending downwardly from lever 94, a holder 96 extends outwardly beyond axis 92, and is adapted to receive and retain one or more weight blocks 98. Holder 96 receives and holds weight blocks 98 of different physical weight. Swing arm 90 is arranged such that upward movement of holder 96 is accompanied with downward movement of lever 94.

Weight blocks 78 and 98 are provided in corresponding pairs of one weight block 78 and one weight block 98 of equal weight. The various pairs thereof can be provided in different weights, for the use and application as will be described.

In the use of switch mechanism 10, for switching a starter winding of a motor, spindle 40 is mounted on a shaft of the motor for rotation of spindle 40 in direct response to the rotation of the motor shaft. First and second terminals 20 and 22 are electrically connected to the starter winding circuit in known fashion, to interrupt the starter winding circuit and disable the starter winding circuit in response to disconnect of the circuit between first and second terminals 20 and 22, as will be described more fully hereinafter.

In a non-rotating state of spindle 40, or if spindle 40 is being rotated sufficiently slow, swing arms 70 and 90 are in the lower most positions of each, as shown in FIG. 1. The resultant effect is that levers 74 and 94 are in the upper most positions. Plunger 50 is thereby urged upwardly by spring 54, and central portion 36 of spring 30 is deflected upwardly, placing second end 28 of contactor 24 into electrically conductive contact with second terminal 22. The circuit through terminals 20 and 22 is complete, and the starter windings connected thereto are operational.

As spindle 40 is rotated as indicated by arrow 100 in FIG. 2, and as the speed thereof increases, centrifugal force results in the outward movement and rise of swing arms 70 and 90, indicated by arrows 102 and 104, and the rotation thereof about axis 72 and axis 92, respectively. As swing arms 70 and 90 move outwardly and rise, levers 74 and 94 are urged downwardly against collar 58. The downward force applied by levers 74 and 94 against collar 58 forces plunger 50 to compress spring 54. In the orientation shown in FIGS. 1 and 2, plunger 50 and coupling 60 are moved downwardly. The deflection in central portion 36 of spring 30 is relaxed, and second end 28 of contactor 24 is moved away from second terminal 22, thereby interrupting the circuit between first and second terminals 20 and 22. Thus, the starter winding circuit electrically connected to terminals 20 and 22 is disabled.

The tension in spring 30 and pivotal engagement of contactor 24 with first terminal 20 cause an abrupt change of position for contactor 24 as spring 30 is moved between deflected and non-deflected positions. Only slight deflection of central portion 36 is required to move end 28 into contact with second terminal 22. Thus, changes between the switch open and switch closed positions shown in FIGS. 1 and 2 occur as rapid, snap-like changes.

Figure 3:
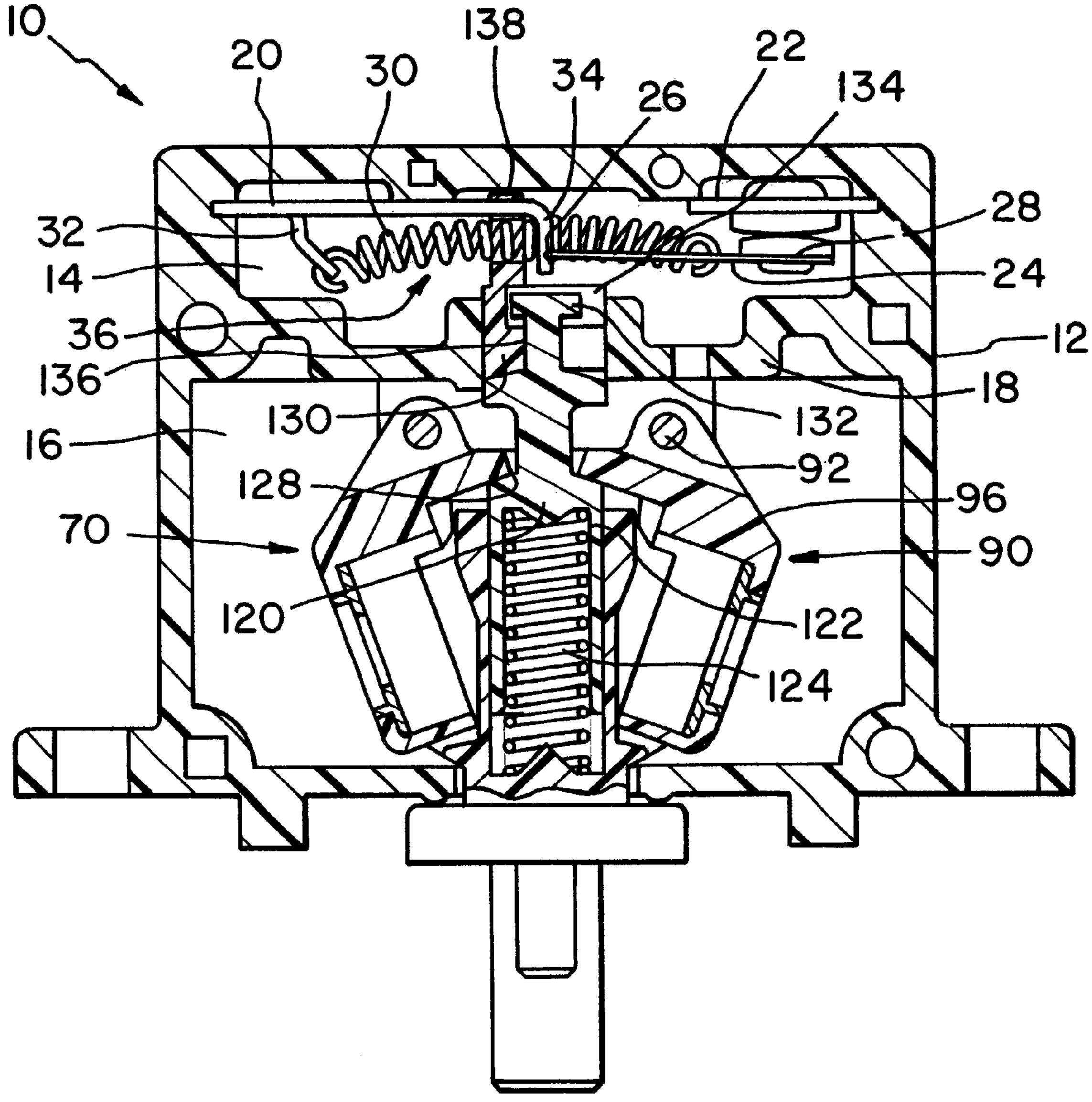
FIG. 3 is a cross-sectional view similar to that shown in FIG. 1, but illustrating a second embodiment of the switch mechanism.

In some situations, micro-welds can occur between second end 28 of contactor 24 and second terminal 22. The mere relaxing of the deflection in spring 30 may not apply sufficient force to break the micro-welds and open the circuit. FIG. 3 illustrates a modified embodiment of switch mechanism 10 that overcomes this situation. A modified plunger 120 has a cavity 122 for a spring 124 operatively associated with spindle 40 as described previously for plunger 50, cavity 52 and spring 54. A shoulder 128 of plunger 120 is in operative arrangement with levers 74 and 94 as described previously with respect to collar 58 of plunger 50. A coupling 130 is mechanically connected to an enlarged end 132 of plunger 120, such as by a snap fit of end 132 in a cavity 134 having a reduced width access opening 136 thereto. Alternatively, end 132 could be assembled by sliding through a side access to cavity 134. Coupling 130 defines a hook 138 that hooks over spring 30, to provide a direct mechanical connection between spring 30 and plunger 120. Thus, as plunger 120 is moved downward, hook 138 pulls downwardly on central portion 36 of spring 30, adding additional force to move spring 30 from a deflected position thereof, and to break any micro-welds that may have been formed.

By changing weight blocks 78 and 98, the rotational speed of spindle 40 sufficient to generate the centrifugal force necessary to operate switch mechanism 10 can be varied. Thus, in assembly of motors, costs can be reduced by not having to provide substantially different mechanisms for switch mechanism 10. All that is necessary for adjusting switch mechanism 10 for different motor operational characteristics is to select and install the correct pair of weight blocks 78 and 98 for the rotational speed at which disconnect of the starter winding circuit is to occur.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A centrifugal switch comprising:

a first electrical terminal;

a second electrical terminal;

an electrical contactor for establishing an electric circuit connection between said terminals, said contactor having an end movable relative to one of said terminals for selectively making and interrupting said connection;

a spindle mounted for rotation;

a plunger operationally engaged with said contactor; and at least one swing arm rotated by said spindle and pivotally mounted for radial movement by centrifugal force and connected to said plunger for movement thereof upon radial movement of said at least one swing arm.

2. The centrifugal switch of claim 1, said at least one swing arm including two swing arms on opposite sides of said spindle.

3. The centrifugal switch of claim 2, said plunger axially aligned with said spindle.

4. The centrifugal switch of claim 3, each said swing arm including a holder and a weight disposed in said holder, each said weight selected for responsiveness to rotational speed of said spindle.

5. The centrifugal switch of claim 4, each said swing arm including a lever engaging said plunger, and a pivotal connection to said spindle above said lever.

6. The centrifugal switch of claim 5, including a spring biasing said plunger upwardly.

7. The centrifugal switch of claim 6, including a second spring engaging said contactor under tension, said second spring adapted and arranged to urge said contactor away from said one of said terminals, and upon deflection of said second spring to urge said contactor into contact with said one of said terminals.

8. The centrifugal switch of claim 7, said second spring coupled between said contactor and the other of said terminals.

9. The centrifugal switch of claim 7, including a mechanical connection between said plunger and said second spring structured for said plunger to pull said second spring from a deflected position of said second spring.

10. The centrifugal switch of claim 1, including a spring biasing said plunger upwardly.

11. The centrifugal switch of claim 10, including a second spring engaging said contactor under tension, said second spring adapted and arranged to urge said contactor away from said one of said terminals, and upon deflection of said second spring to urge said contactor into contact with said one of said terminals.

12. The centrifugal switch of claim 1, said swing arm including a holder and a weight disposed in said holder, said weight selected for responsiveness to rotational speed of said spindle.

13. The centrifugal switch of claim 1, said swing arm including a lever engaging said plunger, and a pivotal connection to said spindle above said lever.

14. A centrifugally operated switch, comprising:

a housing;

a spindle vertically mounted in said housing for rotation, and having an upper end in said housing;

a plunger at said upper end of said spindle, said plunger configured for vertical movement in said housing;

opposed swing arms connected to said spindle, for rotation by said spindle, said swing arms each connected about a substantially horizontal pivot and having a lever below said pivot, said lever having a distal end engaging said plunger for pushing downwardly on said plunger as a rotational speed of said spindle increases;

first and second spaced electrical terminals in said housing; and an electrically conductive contactor extending between said first and second terminals, said contactor being operationally connected to said plunger and having an end movable relative to one of said terminals upon vertical movement of said plunger.

15. The centrifugally operated switch of claim 14, each said swing arm including a holder and a weight disposed in said holder, said weights selected for responsiveness to rotational speed of said spindle.

16. The centrifugally operated switch of claim 14, including a spring biasing said plunger upwardly.

17. The centrifugally operated switch of claim 14, including a second spring engaging said contactor under tension, said second spring adapted and arranged to urge said contactor away from said one of said terminals, and upon deflection of said second spring to urge said contactor into contact with said one of said terminals.

18. The centrifugally operated switch of claim 17, said plunger being mechanically connected to said second spring, and adapted to pull said second spring from a deflected position thereof.

19. The centrifugally operated switch of claim 14, said plunger having a collar, and each said swing arm lever positioned against said collar.

20. The centrifugally operated switch of claim 14, said contactor being pivotally engaged in a notch in the other of said terminals.

21. A method for operating a centrifugal switch, comprising:

providing a housing having electrical terminals therein, a movable contactor between the terminals, a spring engaged with the contactor under tension, a spindle mounted for rotation in the housing and a plunger disposed between the spindle and the contactor;

providing swing arms rotated by the spindle and responsive to changes in centrifugal force to cause movement of the plunger;

moving the plunger by changing centrifugal force on the swing arms;

deflecting a portion of the spring to urge the contactor into engagement with one of the terminals; and removing deflection of the spring to urge the contactor away from the one of the terminals.

22. The method of claim 21, including providing a series of pairs of weights, selecting a pair of said weights based on a target rotational speed of said spindle for operating said switch, and mounting one of said weights of said selected pair in each of said swing arms.

23. A centrifugally operated switch, comprising:

a housing;

a spindle vertically mounted in said housing for rotation, and having an upper end in said housing;

a plunger at said upper end of said spindle, said plunger configured for vertical movement in said housing;

a first spring biasing said plunger upwardly;

opposed swing arms connected to said spindle, for rotation by said spindle, said swing arms each connected about a substantially horizontal pivot and having a lever below said pivot, said lever having a distal end engaging said plunger for pushing downwardly on said plunger as a rotational speed of said spindle increases;

first and second spaced electrical terminals in said housing;

an electrically conductive contactor having a first end engaged with said first terminal and a second end movable between contacting and non-contacting position with said second terminal;

a second spring disposed under tension between said first terminal and said contactor, said second spring adapted and arranged to urge said second end of said contactor away from said second terminal in a non-deflected position of said second spring, and to urge said second end of said contactor into engagement with said second terminal in a deflected position of said second spring; and a coupling engaging a portion of said second spring and said plunger, to transfer movement of said plunger to cause deflection of said second spring.

24. The centrifugally operated switch of claim 23, said coupling hooked to said second spring to transfer movement of said plunger to urge said second spring away from a deflected position.

* * * * *